US008935282B2

(12) United States Patent
Whelan et al.

(10) Patent No.: US 8,935,282 B2
(45) Date of Patent: Jan. 13, 2015

(54) LOCATING RELEVANT DIFFERENTIATORS WITHIN AN ASSOCIATIVE MEMORY

(75) Inventors: John Whelan, Burien, WA (US); Jaime Antonio Flores, Jr., Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/560,437

(22) Filed: Jul. 27, 2012

(65) Prior Publication Data

US 2014/0032592 A1 Jan. 30, 2014

(51) Int. Cl.
G06F 17/30 (2006.01)
(52) U.S. Cl.
CPC .................................. *G06F 17/30533* (2013.01)
USPC .......................................... 707/772; 707/722
(58) Field of Classification Search
CPC ................................................. G06F 17/30533
USPC ................................................. 707/722, 772
See application file for complete search history.

(56) References Cited

U.S. PATENT DOCUMENTS

| 4,144,564 | A | 3/1979 | Lamb |
| 4,149,262 | A | 4/1979 | Lamb et al. |
| 5,014,327 | A | 5/1991 | Potter et al. |
| 2007/0156652 | A1 | 7/2007 | Horstmanshof et al. |
| 2008/0162533 | A1* | 7/2008 | Mount et al. ................. 707/102 |
| 2009/0083207 | A1 | 3/2009 | Aparicio, IV |
| 2010/0174743 | A1 | 7/2010 | Komano et al. |
| 2010/0205212 | A1 | 8/2010 | Quadracci et al. |
| 2010/0257006 | A1 | 10/2010 | Quadracci et al. |
| 2013/0031090 | A1* | 1/2013 | Posse et al. ................. 707/723 |

OTHER PUBLICATIONS

McGraw-Hill Dictionary of Scientific and Technical Terms, 6e, 2003.*
University of Michigan, Associative Memory, Jun. 14, 2012.*
Prokopenko et al., "Optimizing Associative Information Transfer Within Content-addressable Memory," International Journal of Unconventional Computation, vol. 3, Issue 3, Special issue: "Towards Theory of Unconventional Computing," 2008, pp. 273-296.
Extended European Search Report, dated Oct. 24, 2013, regarding Application No. EP13174046.6, 6 pages.

* cited by examiner

Primary Examiner — William Spieler
(74) Attorney, Agent, or Firm — Yee & Associates, P.C.

(57) ABSTRACT

A system including an associative memory comprising a plurality of data and a plurality of associations among the plurality of data. The plurality of data is collected into associated groups. The associative memory is configured to be queried based on at least indirect relationships among the plurality of data. The system also includes an input device in communication with the associative memory. The input device is configured to receive a query to compare entities in the associative memory. The system also includes a coordinator in communication with the associative memory. The coordinator is configured to compare the entities to identify a similar attribute value among the entities. The coordinator is further configured to identify a differentiator among the entities.

12 Claims, 12 Drawing Sheets

FIG. 9

| Perspective: Applicants | | | |
|---|---|---|---|
| Entity: Bill Smith Attributes | | | |
| Title:VP | Entities Like: Bill Smith | | |
| Sex:male | Score | Entity | Matching Attributes |
| Age:45 | 1.00 | Steve Pi ← 908 | Education:college, IQ:105, Skills:computer, GRE:yes, GMAT:no, Age 45, Sex:male |
| Region:nw | 1.00 | Jay Ensell | Education:college, IQ:105, Skills:computer, GRE:yes, GMAT:no, Age 45, Sex:male |
| Skills:computer, typing | 1.00 | Tim Evans | Education:college, IQ:105, Skills:computer, GRE:yes, GMAT:no, Age 45, Sex:male, Skills:typing, 2nd Language:german ← 904 |
| Office Skills:word, exce | | ↑ 906 | |
| Education:college | 0.96 | Guy Harris | Education:college, Skills:computer, GRE:yes, GMAT:no, 2nd Language:none |
| IQ:105 | 0.82 | Dick Harris | Education:college, GRE:yes, Sex:male, 2nd Language:none |
| GRE:yes | | | |
| GMAT:no | | ... | |
| Language:english | | | |
| 2nd Language:none | | | |

900

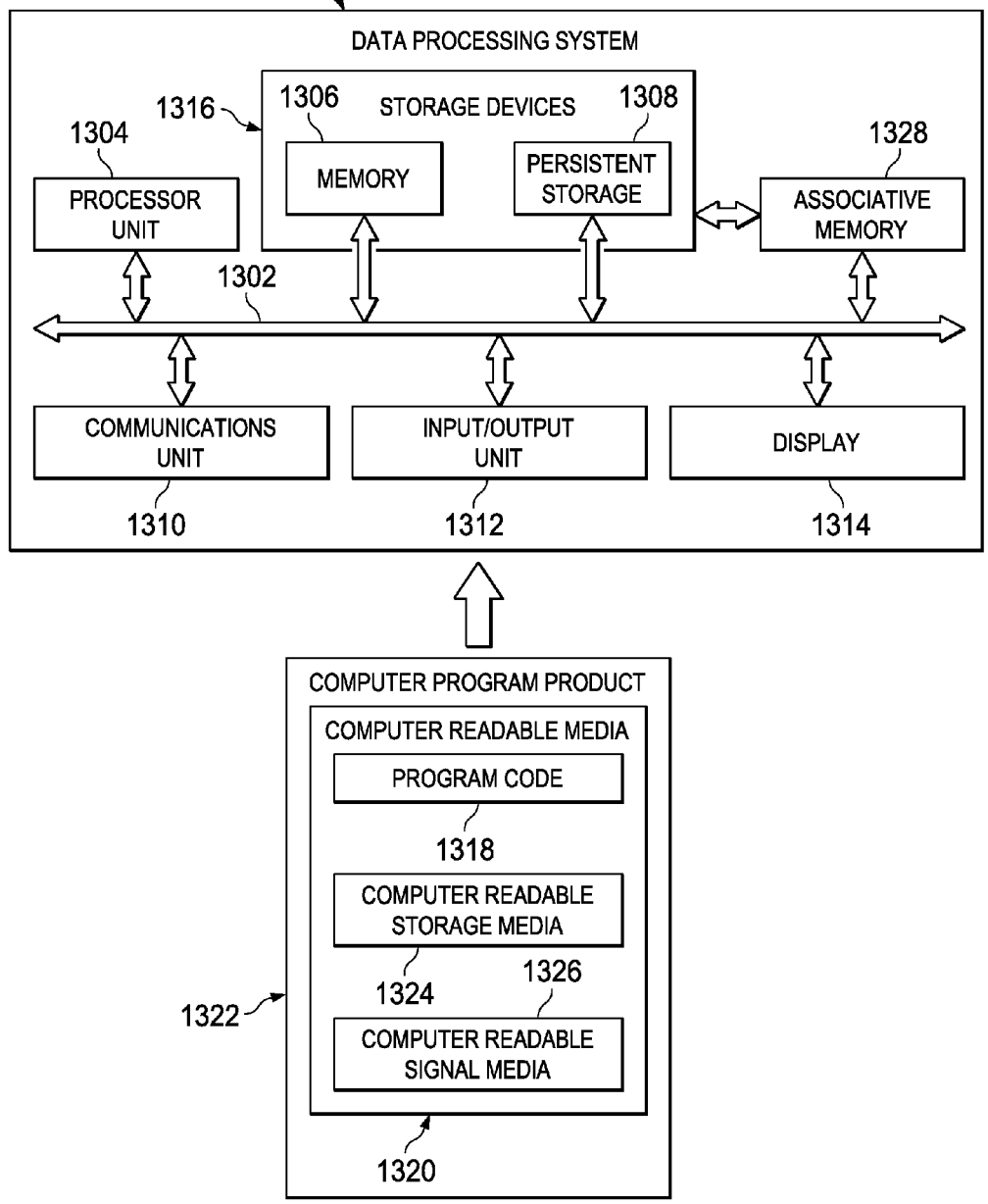

LOCATING RELEVANT DIFFERENTIATORS WITHIN AN ASSOCIATIVE MEMORY

BACKGROUND INFORMATION

1. Field

The present disclosure relates generally to associative memories and, in particular, a system and method for locating relevant differentiators within an associative memory in order to distinguish otherwise matching results.

2. Background

When querying an associative memory, isolating relevant differences among the results may be difficult. For example, entities may be more different than alike. Therefore, locating relevant differences may be akin to looking for a needle in a haystack. For instance, two applicants can have resumes showing similar skills, while the rest of their resumes can be different. The relevant differences are difficult to identify.

Using an associative memory to solve this problem may involve an undesirable method of searching known as "hunt and peck". While associative memories perform well when finding associations and relationships among entities, they perform relatively poorly when finding relevant differentiators among the same associations and relationships among entities.

Thus, issues may arise when performing a query of an associative memory to find desired information that includes relevant differences among the search results. For example, a query may result in ten matches that appear to be all the same. Finding the relevant differences between them is difficult. Therefore, it would be desirable to have a system and method that takes into account at least some of the issues discussed above as well as possibly other issues.

SUMMARY

The illustrative embodiments provide for a system. The system includes an associative memory having a plurality of data and a plurality of associations among the plurality of data. The plurality of data is collected into associated groups. The associative memory is configured to be queried based on at least indirect relationships among the plurality of data. The system also includes an input device in communication with the associative memory. The input device configured to receive a query to compare entities in the associative memory. The illustrative embodiments also provide for a coordinator in communication with the associative memory. The coordinator is configured to compare the entities to identify a similar attribute value among the entities. The coordinator is further configured to identify a differentiator among the entities.

The illustrative embodiments provide for another system. This system may include an associative memory including an associative memory comprising a plurality of data and a plurality of associations among the plurality of data. The plurality of data is collected into associated groups. The associative memory is configured to be queried based on at least indirect relationships among the plurality of data. The system also includes an input device in communication with the associative memory. The input device is configured to receive a query to compare a first entity to a second entity using the associative memory. The input device is further configured to receive an attribute category associated with both the first entity and the second entity. The system also includes a coordinator in communication with the associative memory. The coordinator is configured to compare first attribute values of the first entity and second attribute values of the second entity. The first attribute values and the second attribute values both associated with the attribute category. The coordinator is further configured to remove third attribute values from both the first attribute values and the second attribute values. The third attribute values are common to both the first attribute values and the second attribute values. The coordinator is further configured to store a fourth attribute value that remains after removal of the third attribute values. The fourth attribute value is associated with one of the first entity and the second entity.

The illustrative embodiments also provide for a method implemented in an associative memory including a plurality of data and a plurality of associations among the plurality of data, wherein the plurality of data is collected into associated groups, wherein the associative memory is configured to be queried based on at least indirect relationships among the plurality of data. The method includes receiving, at an input device in communication with the associative memory, a query to compare entities in the associative memory. The method also includes comparing, using a coordinator in communication with the associative memory, the entities to identify a similar attribute value among the entities. The method also includes identifying, using the coordinator, a differentiator among the entities.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is a diagram illustrating an entity comparison with relevant differentiators, in accordance with an illustrative embodiment;

FIG. 13 is an illustration of a data processing system, in accordance with an illustrative embodiment.

DETAILED DESCRIPTION

Figure 1:
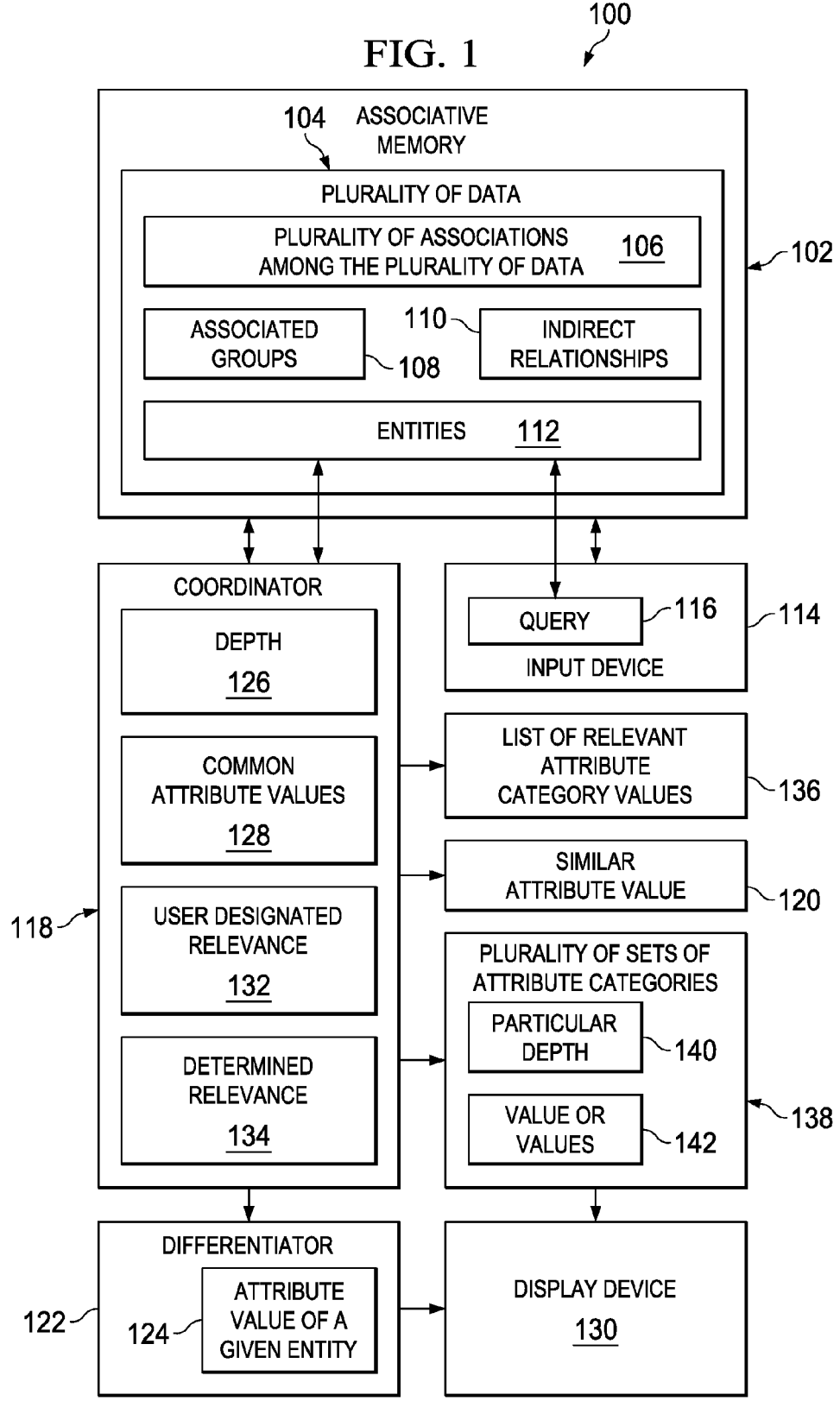
FIG. 1 is a block diagram of a system for locating differentiators in an associative memory, in accordance with an illustrative embodiment.

The illustrative embodiments provide several useful functions. For example, the illustrative embodiments recognize and take into account that issues may arise when performing a query of an associative memory to find desired information that includes relevant differences among the search results. For example, a query may result in ten matches that appear to be all the same. Finding the relevant differences between them is difficult.

The illustrative embodiments also recognize and take into account that associative memory technology may be effective at performing comparisons to find similarities between compared entities, but is relatively ineffective at performing comparisons to find relevant differences between the same entities.

The illustrative embodiments address these and other issues by providing a system and method for locating a differentiator among entities that otherwise may appear to be the same or similar when performing a query to compare the entities to each other. As used herein, the term "differentiator" means an attribute value of a given entity that is unique relative to all other attribute values of comparable entities having category types equal to a category type of the given entity. A differentiator preferably is relevant to a query, but need not be relevant.

As an aid to understanding the term "differentiator", consider two candidate employees Adam and Beatrice. Both Adam and Beatrice are "entities" for purposes of this example. Both Adam and Beatrice have their own skill sets, which happen to be similar to each other. Skills are attributes, or category types, and their attribute values are the particular skills. For example, "language" may be a category type (an attribute) and "English" may be a value for the category type (attribute value).

An employer uses an associative memory to compare the skills Adam and Beatrice possess. The associative memory returns a result that both people are fluent in English, German, Italian, and Spanish. The employer sees that both candidates have all required language skills. Thus, the employer does not have a readily available way to distinguish Adam from Beatrice, even though more information about each candidate is available in the associative memory.

However, the two candidates do have differences that are relevant to the job, but these differences may not necessarily be easy to find through comparison of the two candidates using a comparison query for an associative memory. For example, the evaluator determines that "computer skills" are also relevant to the position to be filled. Beatrice has computer programming skills and Adam does not, whereas Adam has computer repair skills and Beatrice does not. In this case, both "computer programming" and "computer repair" are "differentiators". These skills share the same category type (attribute category) of "computer skills", but each is unique to only one candidate (entity).

The illustrative embodiments demonstrate a system and method that can identify these differences and highlight them along with highlighting the language skill that Adam and Beatrice each have. Thus, an employer can more readily find the relevant differentiators between Adam and Beatrice using an associative memory, and hence, better evaluate the candidates.

The above example is simple. In a more realistic example, hundreds or even thousands of candidates may be evaluated simultaneously along a dozen category types. In this case, dozens or even hundreds of candidates may appear to be exactly the same when using the associative memory to compare the candidates. The illustrative embodiments provide for a system and method that allows the evaluator to find relevant differentiators among the candidates in order to quickly identify the ideal candidates for further evaluation.

The illustrative embodiments are not limited to human resources applications. The illustrative embodiments have business, military, and scientific applications, as well as applications in other areas. Thus, the above examples should not be read as limiting the claimed inventions.

Attention is now turned to the terms used in this application. For example, the term "differentiator" is defined above.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. The associative memory may also be configured to be queried based on direct relationships, as well as combinations of direct and indirect relationships.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation.

As used herein, the term "entity" refers to an object that has a distinct, separate existence, though such existence need not be a material existence. Thus, abstractions and legal constructs may be regarded as entities. As used herein, an entity need not be animate.

FIG. 1 is a block diagram of a system for locating differentiators in an associative memory, in accordance with an illustrative embodiment. System 100 shown in FIG. 1 may be implemented using one or more data processing systems, possibly in a distributed or networked environment, and possibly by a group of remotely administered data processing systems known as the "cloud". Each of the one or more data processing systems that implement system 100 may be data processing system 1300 described with respect to FIG. 13, or variations thereof. System 100 may be characterized as including one or more blocks. Each of these blocks may be separate or may be part of a monolithic architecture.

System 100 may include associative memory 102. Associative memory 102 may include plurality of data 104 and plurality of associations among the plurality of data 106. Plurality of data 104 may be collected into associated groups 108. Associative memory 102 may be configured to be queried based on indirect relationships 110 among plurality of data 104 in addition to direct correlations among plurality of data 104.

Associative memory 102 may store entities 112. Associative memory 102 may also store relationships, both direct and indirect, among entities 112. Associative memory 102 may also store individual information about each of entities 112.

System 100 may include input device 114 in communication with associative memory 102. Input device 114 may be configured to receive query 116 to compare entities 112 in associative memory 102. Input device 114 may be a tangible device configured to receive input. Examples of input device 114 include, but are not limited to, a keyboard, a mouse, a touch screen, a tangible processor configured to receive data, a data bus, a tangible voice recognition system, and other types of devices.

System 100 also includes coordinator 118. Coordinator 118 may be in communication with associative memory 102. Coordinator 118 may be configured to compare entities 112 to identify similar attribute value 120 among the entities 112. Coordinator 118 further may be configured to identify differentiator 122 among entities 112.

In an illustrative embodiment, differentiator 122 may be an attribute value of a given entity 124 that is unique relative to all other attribute values of comparable entities having category types equal to a category type of the given entity. Further, the differentiator may be relevant to query 116.

In an illustrative embodiment, coordinator 118 may be further configured to identify differentiator 122 by receiving a value identifying a depth 126 of an attribute of an entity to include. In this case, coordinator 118 may be further configured to identify differentiator 122 by removing common attribute values 128 that are common to any two of entities 112 and are relevant to query 116. Alternatively, one or more of common attribute values 128 may be beyond depth 126 that was previously identified.

In an illustrative embodiment, system 100 may also include display device 130. Display device 130 may be in communication with associative memory 102. Display device 130 may be configured to display differentiator 122.

In an illustrative embodiment, coordinator 118 may be further configured to coordinate user-designated relevance 132 of attribute categories and determined relevance 134 of attribute category values that are determined by the associative memory. Coordinator 118 may be programmed to establish list of relevant attribute category values 136 as a result of a coordination. Coordinator 118 may be further configured to use the list to identify differentiator 122. In a further illustrative embodiment, associative memory 102 may be configured to store the list and to order the relevant attribute category values in order of relevance.

In another illustrative embodiment, coordinator 118 may be further configured to examine plurality of sets of attribute categories 138 to particular depth 140. Coordinator 118 may be further configured to determine what value or values 142 are relevant in identified differences among plurality of sets of attribute categories 138.

The illustrative embodiments shown in FIG. 1 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
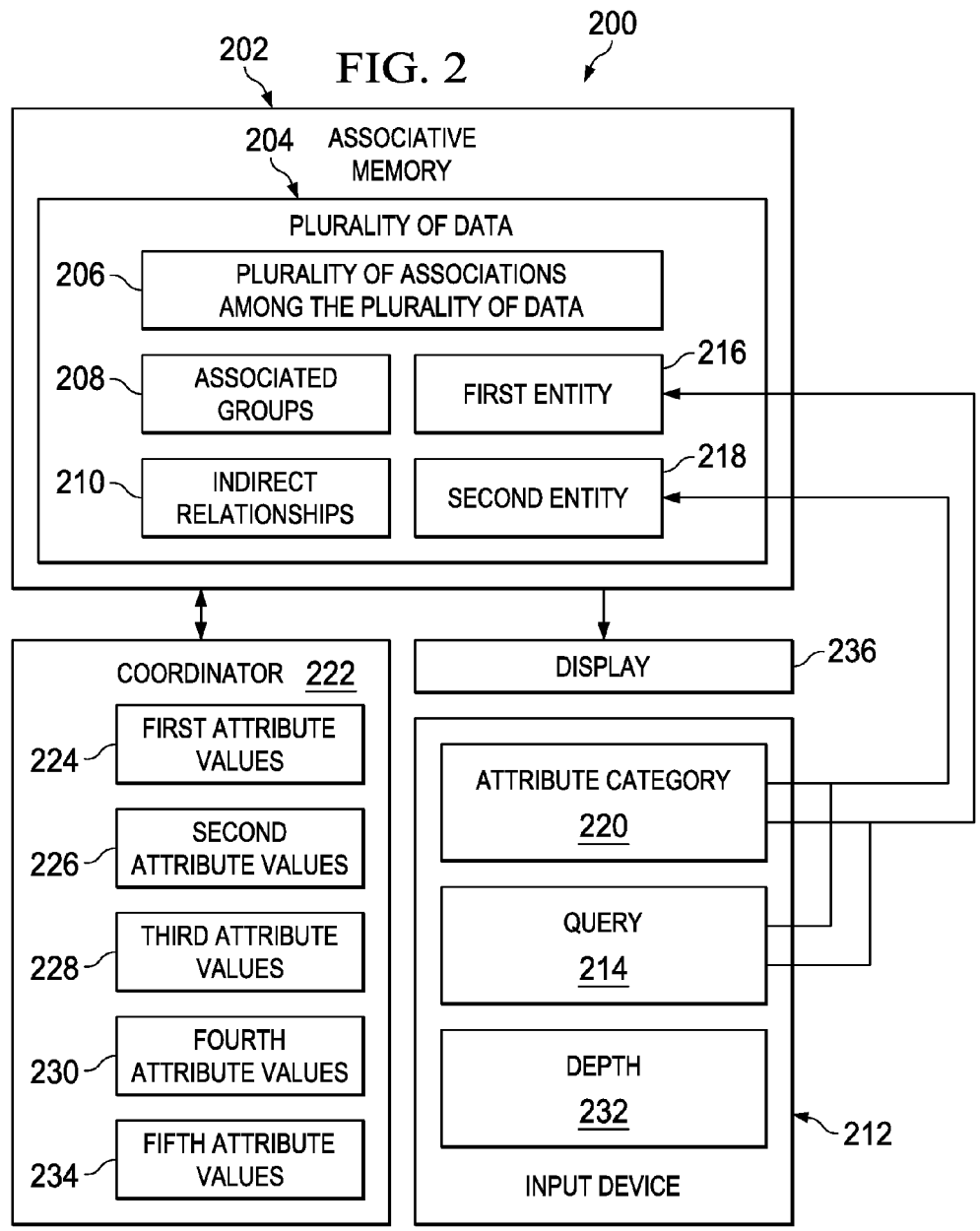
FIG. 2 is a block diagram of a system for locating differentiators in an associative memory, in accordance with an illustrative embodiment.

FIG. 2 is a block diagram of a system for locating differentiators in an associative memory, in accordance with an illustrative embodiment. System 200 shown in FIG. 2 may be implemented using one or more data processing systems, possibly in a distributed or networked environment, and possibly by a group of remotely administered data processing systems known as the "cloud". Each of the one or more data processing systems that implement system 200 may be data processing system 1300 described with respect to FIG. 13, or variations thereof. System 200 may be characterized as including one or more blocks. Each of these blocks may be separate or may be part of a monolithic architecture. System 200 may be system 100 of FIG. 1.

System 200 may include associative memory 202. Associative memory 202 may include plurality of data 204 and plurality of associations among the plurality of data 206. Plurality of data 204 may be collected into associated groups 208. Associative memory 202 may be configured to be queried based on indirect relationships 210 among plurality of data 204 in addition to direct correlations among plurality of data 204.

System 200 may include input device 212 in communication with associative memory 202. Input device 212 may be configured to receive query 214 to compare first entity 216 to second entity 218 using associative memory 202. Input device 212 further may be configured to receive attribute category 220, which is associated with both first entity 216 and second entity 218.

System 200 may also include coordinator 222, which may be in communication with associative memory 202. Coordinator 222 may be configured to compare first attribute values 224 of first entity 216 and second attribute values 226 of second entity 218. First attribute values 224 and second attribute values 226 both may be associated with attribute category 220. Coordinator 222 further may be configured to remove third attribute values 228 from both first attribute values 224 and second attribute values 226. Third attribute values 228 are common to both first attribute values 224 and second attribute values 226.

Coordinator 222 further may be configured to store fourth attribute value 230 that remains after removal of third attribute value 228. Fourth attribute value 230 may be associated with one of first entity 216 and second entity 218. Fourth attribute value 230 may be unique to the one of first entity 216 and second entity 218.

In an illustrative embodiment, input device 212 may be further configured to receive depth 232 of attribute values to include when comparing the entities. This depth may be used to limit which differentiators may be displayed.

In an illustrative embodiment, coordinator 222 further may be configured to remove fifth attribute values 234 from one or both of first attribute values 224 and second attribute values 226. Fifth attribute values 234 may be beyond depth 232.

In an illustrative embodiment, system 200 may include display 236 in communication with associative memory 202. Display 236 may be configured to display fourth attribute value 230. Display 236 may be further configured to highlight fourth attribute value 230 and also to display fifth attribute values 234 common to both first entity 216 and second entity 218.

The illustrative embodiments shown in FIG. 2 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 3:
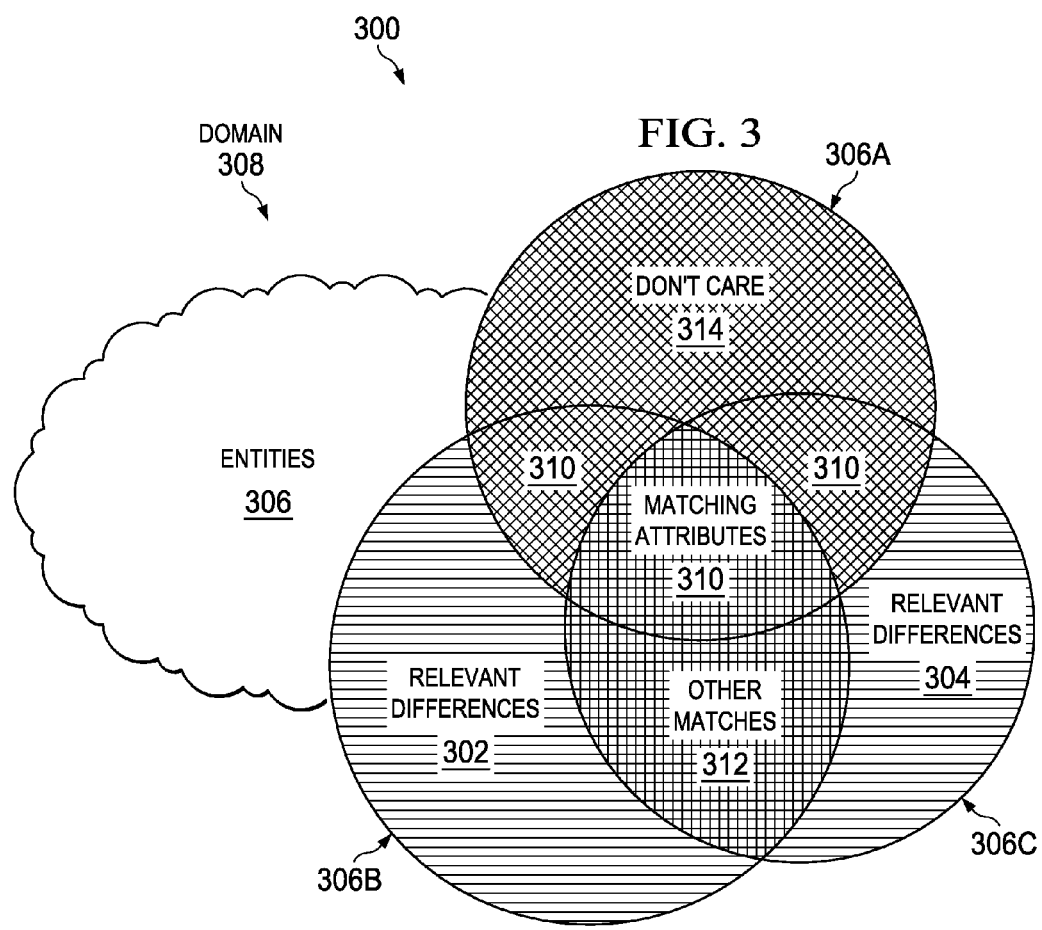
FIG. 3 is a Venn diagram illustrating identification of relevant differences, in accordance with an illustrative embodiment.

FIG. 3 is a Venn diagram illustrating identification of relevant differences, in accordance with an illustrative embodiment. Venn diagram 300 illustrates identification of relevant differences in an associative memory, such as associative memory 102 of FIG. 1 or associative memory 202 of FIG. 2. Thus, Venn diagram 300 may be an abstract view useful for understanding issues with respect to identification differentiators, such as differentiator 122 of FIG. 1 or fourth attribute value 230 of FIG. 2.

The illustrative embodiments locate relevant differences 302 and relevant differences 304 in relation to entity comparisons in an associative memory. Relevant differences may also be termed relevant "differentiators". Again, a "differentiator" is an attribute value of a given entity that is unique relative to all other attribute values of comparable entities having category types equal to a category type of the given entity.

More specifically, the illustrative embodiments locate relevant differences 302 and relevant differences 304 among comparisons of entities 306 within domain 308 of an associative memory, such as associative memory 102 of FIG. 1 or associative memory 202 of FIG. 2. Although associative memory is described in detail above, associative memory technology also may be considered the process by which information is collected into associated groups in the interest of gaining new insight based on relationships rather than the direct correlation of data. Domain 308 represents a broad category or an area of interest. A perspective may be considered one's "point of view", or the choice of a context for a particular aspect within a user's area of interest. Thus, a perspective may be a subject within the broad category of domain 308.

Typically, an associative memory may be logically divided into perspectives. For example, domain 308 may be a "job requisitions problem domain" for a particular job position, and "applicants" could be a perspective within this domain. Entities 306 within domain 308 may be individual people. Again, an entity is something that has a distinct, separate existence, though an entity need not be a material existence. For example, abstractions and legal constructs may be regarded as entities. Thus, although the illustrative embodiments are described with respect to entities that are human candidates for a job position, no presumption should be made that an entity must be animate.

Returning to differentiators, stated differently, the illustrative embodiments uncover differentiators among comparables that might otherwise be equal. In this example, a comparable is an entity. Also in this example, comparables include entity 306A, entity 306B, and entity 306C. Entity 306A is the base entity to which entity 306B and entity 306C are compared. The term "don't care" 314 in this illustrative embodiment is used in the sense known in the computer arts, which means that entity 306A is not searched. The term "don't care" represents the attributes of entity 306A that are not part of the comparison search and therefore not taken directly into consideration when deriving relevant differentiators.

The illustrative embodiments locate relevant differences 302 and relevant differences 304. The illustrative embodiments also exclude matching attributes 310. Matching attributes 310 are those attribute values in entity 306B and entity 306C shared with entity 306A. The illustrative embodiments also exclude other matches 312, which include those attribute values in entity 306B and entity 306C that match each other. The illustrative embodiments exclude other matches 312 because the user desires to find relevant differences in these examples, not matching attributes.

Attention is now turned to describing in more detail issues addressed by the illustrative embodiments. When using associative memories to perform entity comparisons, isolating relevant differences among the results can be difficult. The reason for this difficulty resonates from the fact that entities usually share far more differences than similarities. Therefore, trying to locate relevant differences, including differentiators, may be comparable to the cliché of looking for a needle in a haystack. In a more concrete example, two applicants can have resumes showing similar skills, while the rest of their resumes are completely different. Determining what is relevant among those differences, that is locating relevant differentiators, may be undesirably challenging.

Using an associative memory to find differentiators without using the illustrative embodiments would involve undesirable "hunt and peck" searching. While associative memories perform well when finding associations and relationships among entities, they do not do perform as well when differentiating among entities.

Thus, stated differently from above, the illustrative embodiments provide for a systematic approach to locating relevant differences among entity comparisons of a given perspective within an associative memory in order to uncover possible differentiators or to flush out unique aspects among comparables that might otherwise be equal. The illustrative embodiments thus provide an easy mechanism for locating relevant differences among comparable entities. The illustrative embodiments are domain independent, platform independent, and portable.

Figure 4:
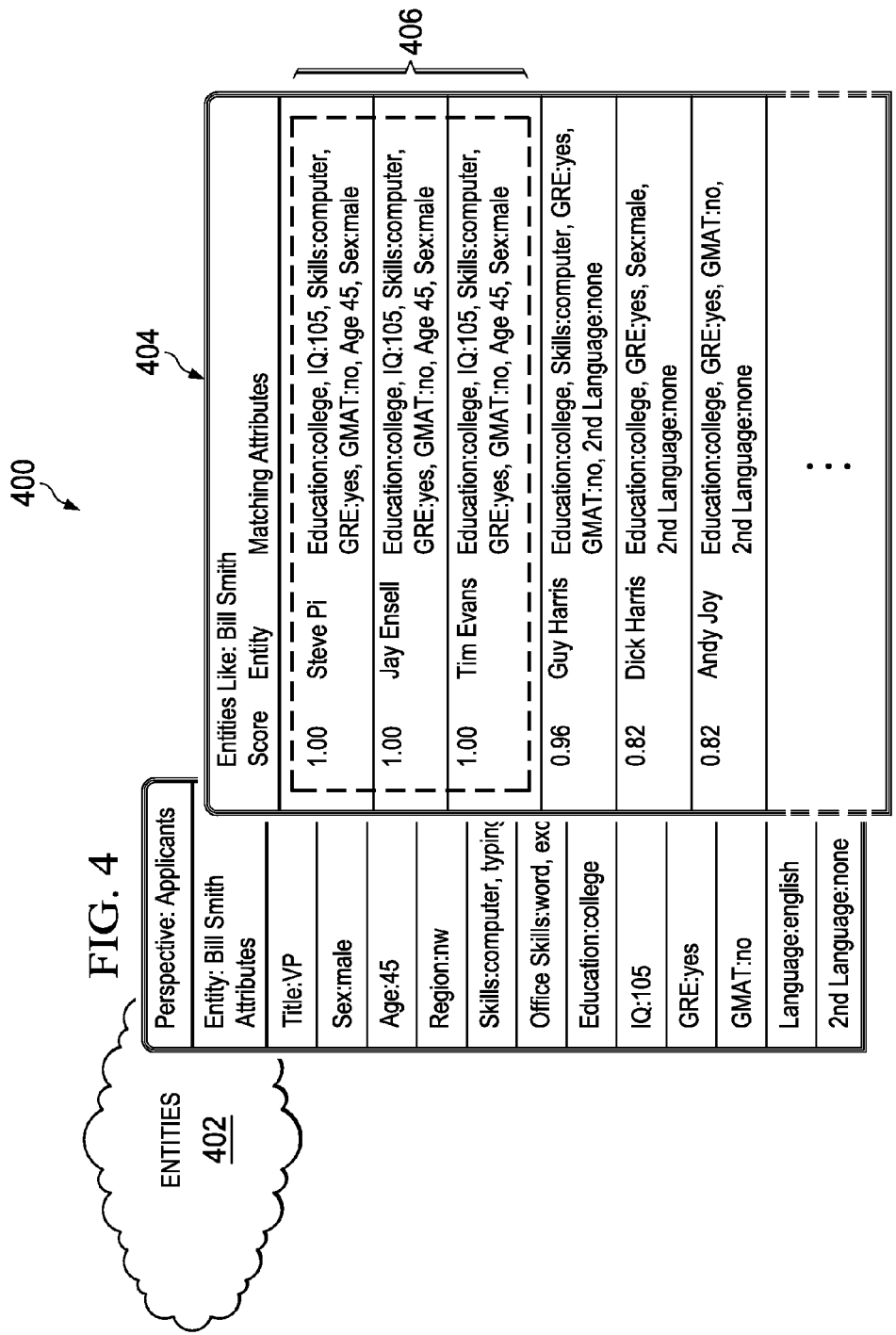
FIG. 4 is a diagram illustrating an entity comparison, in accordance with an illustrative embodiment.

FIG. 4 is a diagram illustrating an entity comparison, in accordance with an illustrative embodiment. Diagram 400 illustrates a common situation that may arise when comparing entities 402. In this case, entities 402 are candidates for a job position. Comparison 404 shows that three entities 406, or "candidates", show exactly the same desired skills based on the comparison requested by a user query of the associative memory storing entities 402. However, the user wants to identify differentiators that may allow the user to better determine which of the three entities 402 are best qualified for the job position.

For all of FIG. 4 through FIG. 11, and throughout this document, all names and data are fictitious. Any resemblance or similarity to real people, entities, or objects is unintentional and no statements are being made or implied regarding any real people, entities, or objects.

The result of finding multiple entities sharing the same attribute values can occur because, within an associative memory, the results of an entity comparison are an ordered list of entities that are similar to the original or sought entity within a perspective. An associative memory collects all the matching attributes among these entities to formulate the list. The order of that list depends on the significance of the matching attributes. Additionally, the ranking of the list correlates to the number of attributes found. As described above, the illustrative embodiments address the issue of multiple similar results by identifying differentiators among entities 402.

Figure 5:
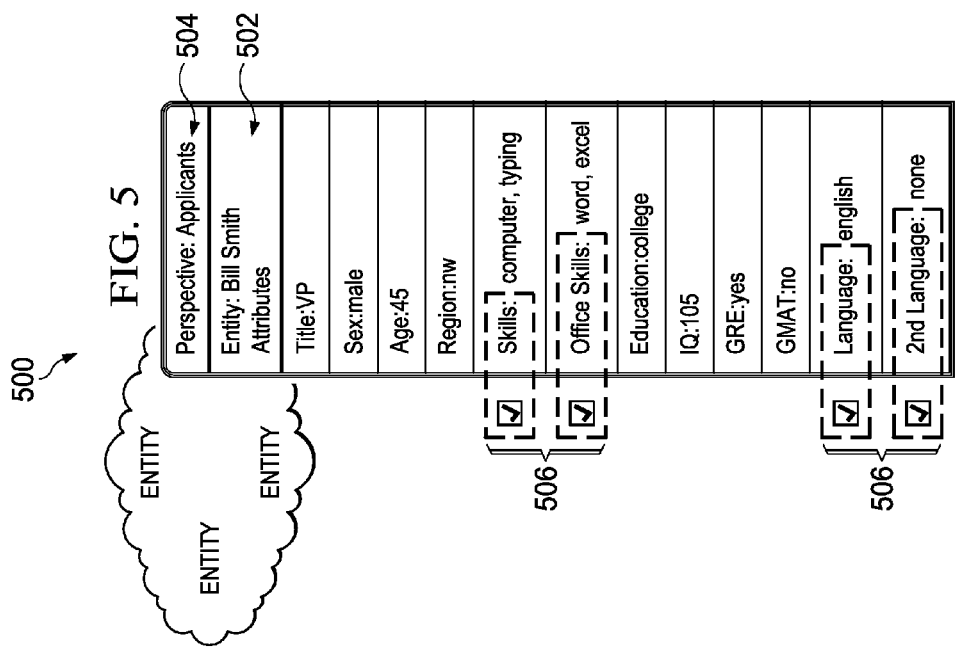
FIG. 5 is a diagram illustrating user selection of attribute categories, in accordance with an illustrative embodiment.

FIG. 5 is a diagram illustrating selection of attribute categories, in accordance with an illustrative embodiment. Diagram 500 illustrates user selection of attribute categories. However, in other illustrative embodiments, this section may occur as the result of an automatic process implemented by hardware or software. Diagram 500 reflects a first step in a process for identifying a relevant differentiator, and may be used in system 100 of FIG. 1 or system 200 of FIG. 2.

For a given or sought entity 502 within perspective 504, the user may select attribute categories 506 for which the user would like to see differences, or determines as relevant. This selection affords the user an opportunity to determine what attribute category or attribute categories are relevant when determining differentiators within a comparison. In the specific example shown in FIG. 5, the user wants to see relevant differences in the attribute categories of skills, office skills, language, and second language. The user has determined these attributes, or categories, are relevant to the search.

The example of FIG. 5 illustrates selection of four attributes. However, more or fewer attributes may be selected, including even a single attribute.

Figure 6:
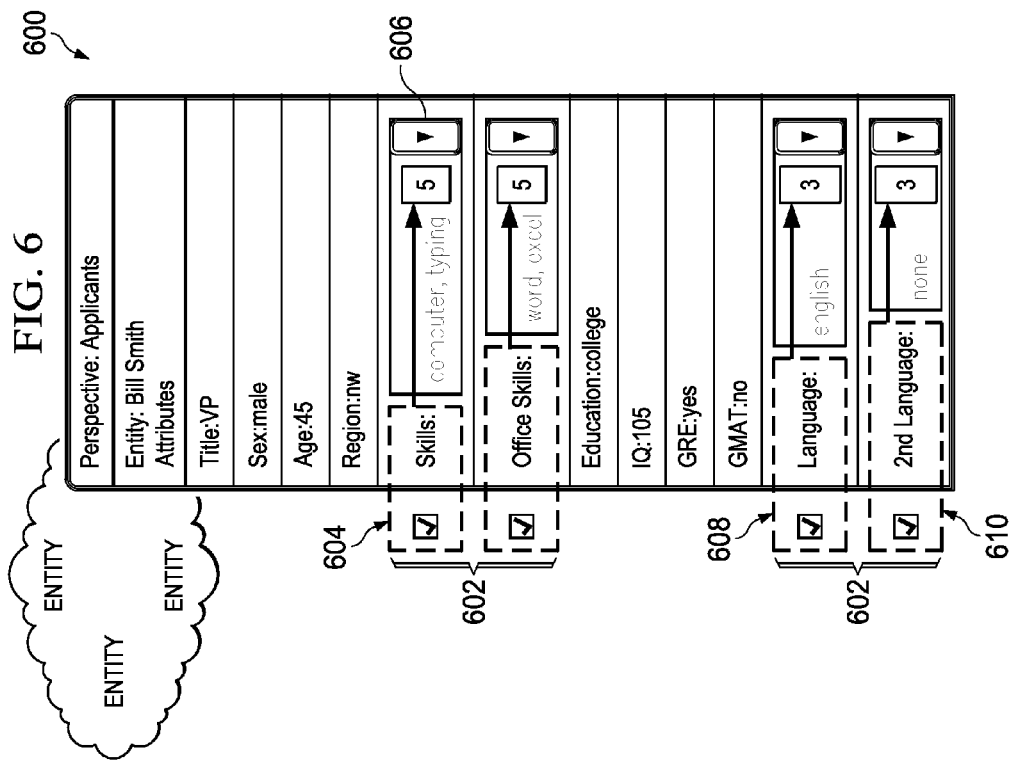
FIG. 6 is a diagram illustrating user selection of a depth of attribute values to include, in accordance with an illustrative embodiment.

FIG. 6 is a diagram illustrating selection of a depth of attribute values to include, in accordance with an illustrative embodiment. Diagram 600 specifically shows individual selection of depths for attributes 602. Attributes 602 correspond to attributes 506 of FIG. 5. Diagram 600 reflects a second step in a process for identifying a relevant differentiator, and should be considered in relation to FIG. 5. The process shown in FIG. 6 may be used in system 100 of FIG. 1 or system 200 of FIG. 2.

For any particular attribute category, an associative memory could contain hundreds of attribute values. For example, attribute category "skills" 604 could contain a wide range of skills ranging from important skills like computer or business skills to less relevant skills like secretarial or facility skills. Because these skills are ordered by relevance or importance, a cut off may be used wherein the skills are separated, the cut off being a guess or approximation as to the point where specific skills in the ordered list are assumed to be less important.

Continuing with the above example, the user may select the value "5" at drop down menu 606. The user could have selected some other value. Other forms of input may be used, other than drop down menus, such as, but not limited to, dialog boxes, voice commands, and other forms of input.

By selecting the depth for attribute category "skills" 604, the user has designated how many skills to include from an ordered list of possible skill values. For example, if a user has 100 skills, by selecting "5" in drop down menu 606, the illustrative embodiments will include the first "5" skill values from an order list of attribute category "skills" that are associated with the sought entity.

Each depth may be selected independently from all other depths in some illustrative embodiments. Thus, for example, a user may decide that a cut off after the first five values of the ordered list is appropriate for attribute category "skills" 604, but that a cut off after the first three values for another ordered list is appropriate for attribute category "language" 608.

Note that attribute category "language" 608 is distinct from attribute category "$2^{nd}$ language" 610. The reason for this distinction is that attribute category "language" 608 reflects the primary language for applicants, whereas attribute category "$2^{nd}$ language" 610 reflects the second language for applicants. In other words, for all multi-lingual applicants, each has a first language and a second language, and the first language may vary among applicants and the second language may also vary among applicants.

The illustrative embodiment described above relates to languages as being differentiators. This example is provided for clearer understanding only, and is not necessarily limiting of the claimed inventions or of other applications of other illustrative embodiments.

The illustrative embodiments described with respect to FIG. 6 may be varied. For example, selection of a depth may be optional in some illustrative embodiments. More or fewer attribute categories may be present, including possibly only one attribute category. Some attribute categories may have a corresponding designated depth; whereas others need not.

Figure 7:
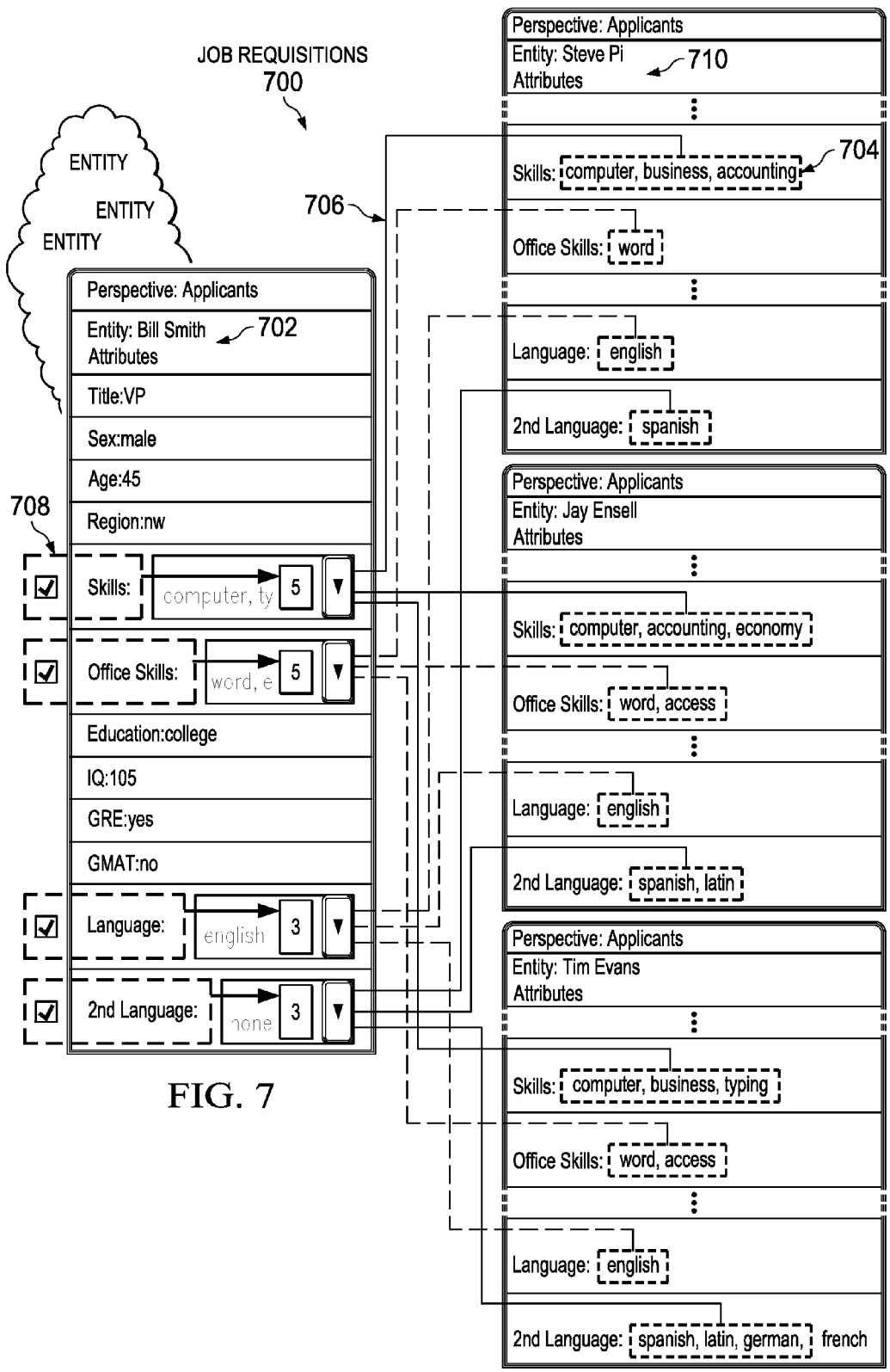
FIG. 7 is a diagram illustrating the identification of relevant attributes, in accordance with an illustrative embodiment.

FIG. 7 is a diagram illustrating the identification of relevant attributes to include, in accordance with an illustrative embodiment. The identification of relevant attributes to use, shown in diagram 700, may be performed by the associative memory. Diagram 700 reflects a third step in a process for identifying a relevant differentiator, and should be considered in relation to FIGS. 5 and 6. The process shown in FIG. 7 may be used in system 100 of FIG. 1 or system 200 of FIG. 2.

FIG. 7 specifically shows identification of relevant attributes like entity "Bill Smith" 702. The relevant attributes are shown as being within an enclosed square, such as square 704. Each enclosed square has a lead line, such as lead line 706. Each lead line indicates a corresponding attribute category, such as attribute category "skills" 708. Thus, for example, square 704 shows the three "skills" for entity "Steve Pi" 710. The three skills are within the depth of five designated for attribute category "skills" 708, and thus all three are shown.

For each result of an entity comparison within a perspective, such as the "Applicants" perspective shown for all of the entities displayed in diagram 700, the associative memory may use the selected categories as provided in FIG. 5 and include the resulting attributes to the depth designated in FIG. 6. The search is used to determine if attribute values within the attribute categories are unique to a given entity; this process may be shown in FIG. 8. By virtue of the user designation in FIG. 5, the attribute category values have already been predetermined to be relevant because the corresponding attribute categories and corresponding depth values have been predetermined to be relevant to the results.

The associative memory may be commanded to maintain a list of the collected attribute category values for each attribute category within each entity result within a perspective. FIG. 7 shows how the associative memory may collect the attribute category values desired. The associative memory may repeat this process for all of the entities within the result set.

Diagram 700 does not reflect all possible variants for finding relevant attributes or attribute category values. For example, more or fewer attribute categories may be designated, more or fewer attribute categories may be present, and other values for depths may be used. The illustrative embodiments may also be used in the context of other applications, other than human resource management.

Figure 8:
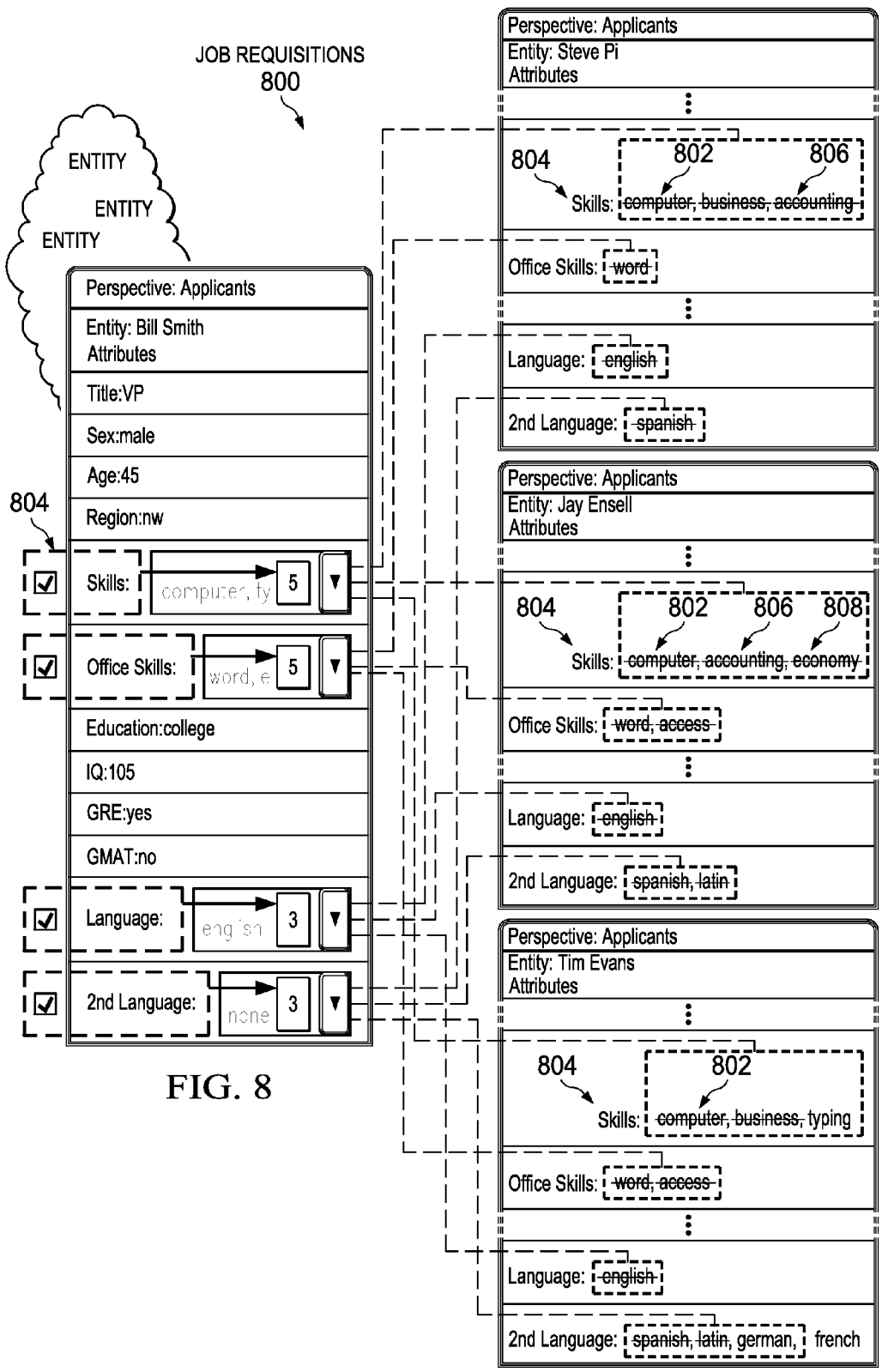
FIG. 8 is a diagram illustrating the removal of duplicate attributes, in accordance with an illustrative embodiment.

FIG. 8 is a diagram illustrating the removal of duplicate attributes, in accordance with an illustrative embodiment. Diagram 800 shows how the associative memory may be programmed to remove duplicate attribute values relative to all entities being compared. Diagram 800 reflects a fourth step in a process for identifying a relevant differentiator, and should be considered in relation to FIG. 5 through FIG. 7. The process shown in FIG. 8 may be used in system 100 of FIG. 1 or system 200 of FIG. 2.

Once the associative memory has collected a list of attributes for each selected attribute category for each entity result within a perspective, the associative memory then may compare each attribute in that list with all of the other attributes of the same attribute category within the result set. If the associative memory finds any duplicate attribute values, that is those attribute values which share the same attribute category, the associative memory may remove such duplications from the list, as shown in FIG. 8.

For example, the attribute category value "computer" 802 under attribute category "skills" 804 is the same for all three entities being compared. Because attribute category value "computer" 802 appears for multiple entities, this attribute value is removed from the list. Likewise, because attribute category value "accounting" 806 appears for two of the three entities compared, this attribute value is also removed from the list.

In an illustrative embodiment, duplicate attribute category values need not appear within the depth specified for one or more of the entities. Thus, for example, if an attribute category value appears outside of the specified depth then this attribute category value may also be removed.

Stated differently, an attribute category value may be removed from the list of relevant attribute category values even if only one other occurrence of that attribute category value appears within all the attributes of the same category within the result set, even if that occurrence is past a specified search depth. In addition, the associative memory need not search the attribute categories of the sought entity, as the occurrence of the attribute category value is not considered relevant. If the attribute category value had been considered relevant, that attribute category value would be a required match and eliminate itself from being a differentiator. In essence, in some illustrative embodiments a distinction need not be made as to the relevance of the attributes of the sought entity. That determination may be left to the user.

For example, the attribute category value "economy" 808 is located within the attribute category "skills" 804 of another applicant not shown in FIG. 8, but within the result set. Thus, attribute category value "economy" 808 is eliminated from the list, even if attribute category value "economy" 808 in the skill set of the other applicant was beyond the depth of "five" specified for attribute category "skills" 804.

FIG. 9 is a diagram illustrating an entity comparison with relevant differences, in accordance with an illustrative embodiment. Diagram 900 shows first differentiator 902 and second differentiator 904 displayed and highlighted in a results set. Diagram 900 reflects a fifth step in a process for identifying a relevant differentiator, and should be considered in relation to FIG. 5 through FIG. 8. The process shown in FIG. 9 may be used in system 100 of FIG. 1 or system 200 of FIG. 2.

In this illustrative embodiment, "entity" Tim Evans 906 includes two relevant differentiators. First differentiator 902 occurs in the attribute category "skills", which has a value of "typing". Second differentiator 904 occurs in the attribute category "second language", which has a value of "German".

By definition, none of the other entities, or job applicants, have either these two skills indicated by the displayed differentiators. Furthermore, by implication, all other entities do not have any skills that are differentiators relative to the other entities. Thus, entity "Tim Evans" 906 stands out from among all other qualified candidates that otherwise have the same relevant skill set.

The illustrative embodiments shown in FIG. 9 may be varied. For example, possibly different entities have different differentiators. For example, entity "Jay Ensell" 908 could have first differentiator 902, while entity "Tim Evans" 906 has second differentiator 904. In some illustrative embodiments, all entities have at least one differentiator. In some illustrative embodiments, no entities have any differentiators. In still other illustrative embodiments, more than two differentiators may be present for a given entity. Furthermore, as the result set widens or increases, in some cases one could expect the differentiators to change.

The illustrative embodiments may be further varied. For example, the illustrative embodiments may have military, business, scientific, political, marketing, or other applications. Thus, the illustrative embodiments are not limited to the human resources example shown in FIG. 9.

Figure 10:
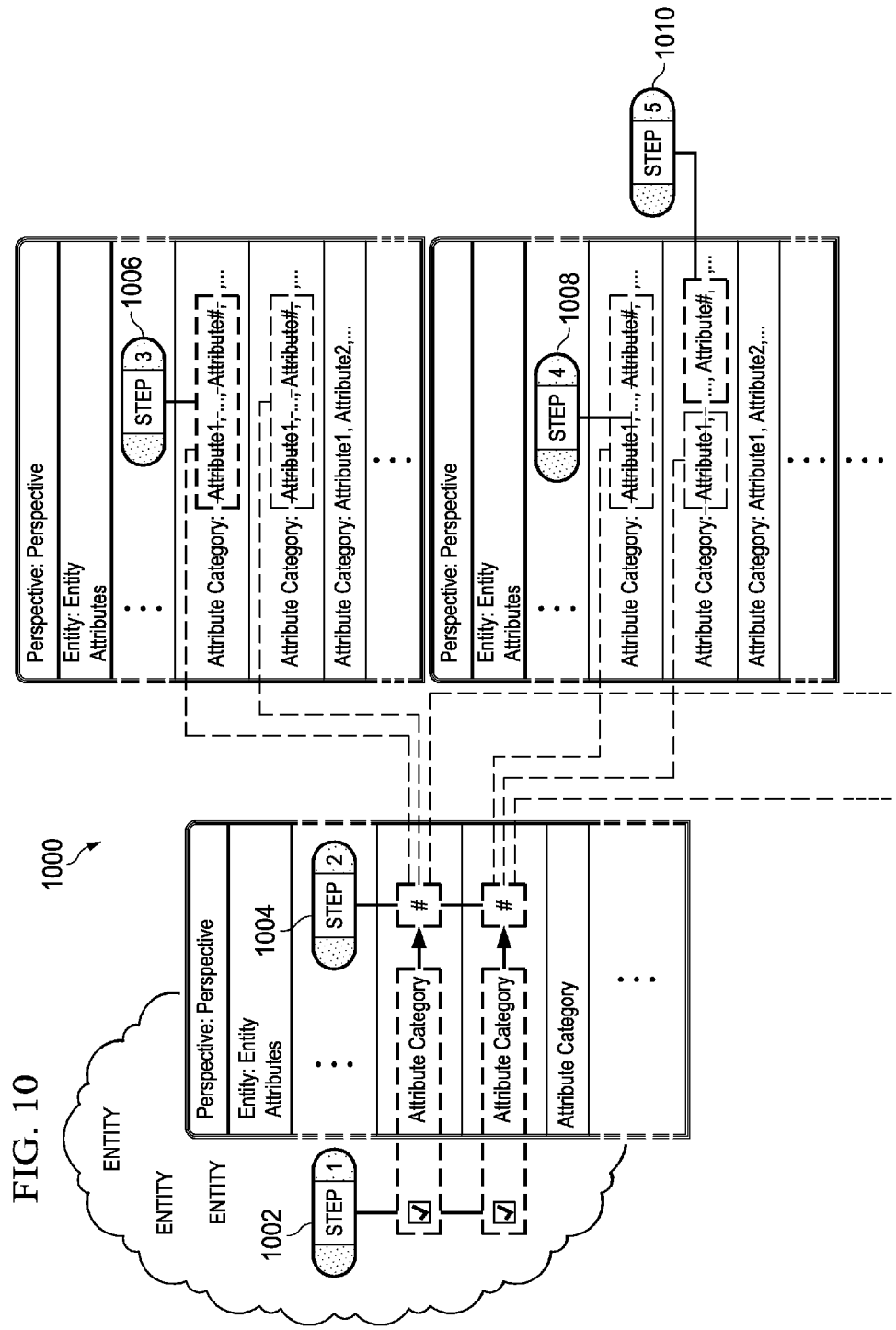
FIG. 10 is a diagram illustrating a process for identifying a relevant differentiator, in accordance with an illustrative embodiment.

FIG. 10 is a diagram illustrating a process for identifying a relevant differentiator, in accordance with an illustrative embodiment. Diagram 1000 may be a summary of the steps described with respect to FIG. 5 through FIG. 9.

In "step 1" 1002 a user or computer program may select attribute categories deemed to be relevant. These selected attribute categories are those attribute categories for which finding one or more differentiators is desired as also outlined in FIG. 5. Optionally, in "step 2" 1004, a user or computer program may select a depth of attribute category values to include for a given attribute category, as also outlined in FIG. 6.

In "step 3" 1006, relevant attribute category values to use are determined by the associative memory, as also outlined in FIG. 7. The actual attribute category values used may be limited by the corresponding depth selected at "step 2" 1004.

In "step 4" 1008, all attribute category values common to more than one entity are deleted from the list of attribute category values, as also outlined in FIG. 8. All remaining attribute category values are relevant differentiators. Possibly only one differentiator may be present. In some cases zero differentiators may be present, in which case the user or computer program may desire to modify the comparison by increasing the depth or increasing the number of attribute categories considered relevant.

In "step 5" 1010, one or more relevant differentiators, if found, are displayed, as also outlined in FIG. 9. Optionally, displayed differentiators may be highlighted using a different color, different fonts, or other means for highlighting.

The illustrative embodiment shown in FIG. 10 is meant to be a summary only, and does not necessarily limit the claimed inventions. Additionally, the illustrative embodiment of FIG. 10 may be varied, as described with respect to FIG. 5 through FIG. 9, or with respect to FIG. 11.

Figure 11:
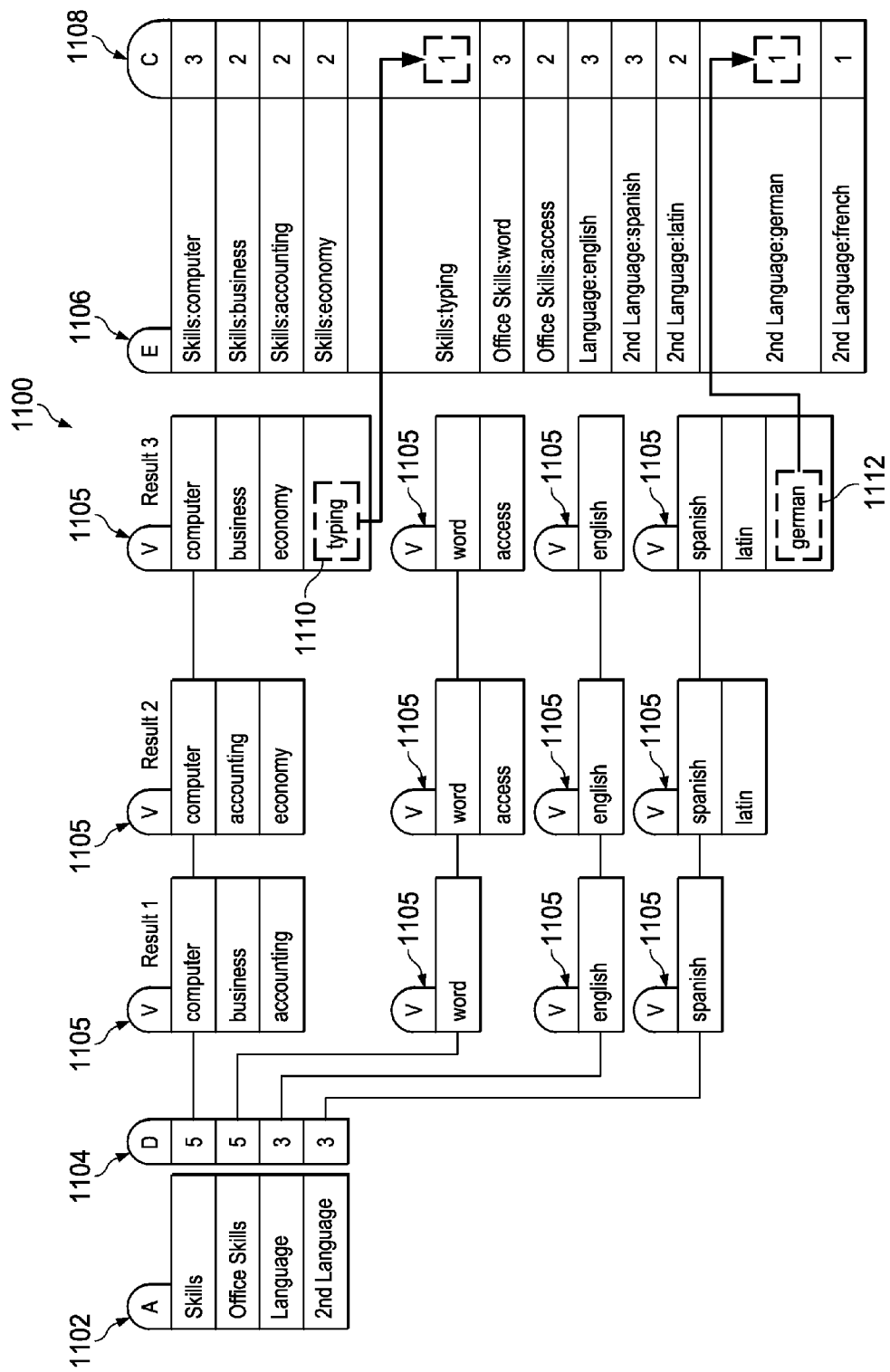
FIG. 11 is a diagram demonstrating a possible implementation of a process for identifying a relevant differentiator, in accordance with an illustrative embodiment.

FIG. 11 is a diagram demonstrating a possible implementation of a process for identifying a relevant differentiator, in accordance with an illustrative embodiment. The process shown in FIG. 11 may be implemented by system 100 of FIG. 1, system 200 of FIG. 2, or data processing system 1300 of FIG. 13. The process shown in FIG. 11 is an alternative description or implementation of the process shown in FIG. 10, or of the process shown in FIG. 5 through FIG. 9. With respect to FIG. 11, a "process" is described as performing an action. As used herein, a "process" is considered to be a non-transitory processor or other physical device configured to perform the action described, or may be considered to be a non-transitory computer readable storage medium storing computer usable program code configured, when executed, to carry out the action described.

In a first step of the process shown in FIG. 11, a list is generated. The list is list of attribute categories "A" 1102, as selected by the user, per perspective, per domain. The list may also be designated by a computer process in other illustrative embodiments.

In a second step of the process shown in FIG. 11, for each category within list of attribute categories "A" 1102, the process records a corresponding depth-count "D" 1104. Each corresponding depth count may be selected by the user, or by a computer process. Depth-count "D" 1104 may be similar to particular depth 140 of FIG. 1, depth 232 of FIG. 2, the depth indicated at drop down menu 606 of FIG. 6, or as elsewhere described herein.

In a third step of the process shown in FIG. 11, for each result from an entity comparison, the process creates new list of attributes category values "V" 1105 for each attribute category in list of attribute categories "A" 1102. New list of attributes category values "V" 1105 may be determined according to depth-count "D" 1104 for each corresponding attribute category.

In a fourth step of the process shown in FIG. 11, the process creates new list of all attribute category values "E" 1106. New list of all attribute category values "E" 1106 may contain a key as defined by an "attribute category:attribute value" pair and its corresponding count "C" 1108. The process then inserts all attribute category values associated with list of attribute categories "A" 1102 into new list of all attribute category values "E" 1106. Each time a value is added, the process checks to see if the value is already in new list of all attribute category values "E" 1106. If so, the process increments count "C" 1108 corresponding to the attribute category value in question.

In a fifth step of the process shown in FIG. 11, when displaying differentiators, the process uses the values from new list of attributes category values "V" 1105 as a key for the values in new list of all attribute category values "E" 1106, but select only the item or items from new list of all attribute category values "E" 1106 whose count "C" 1108 is exactly equal to 1. These values are differentiators.

In the illustrative embodiment of FIG. 11, the differentiators are highlighted as first differentiator 1110 and second differentiator 1112. For the sake of ease of understanding, first differentiator 1110 may correspond to first differentiator 902 in FIG. 9. Likewise, second differentiator 1112 may correspond to second differentiator 904 of FIG. 9. Thus, the illustrative embodiment of FIG. 11 shows an alternative technique for arrival at the result shown in FIG. 9 using the same set of underlying data common to both FIG. 9 and FIG. 11.

The illustrative embodiment shown in FIG. 10 does not necessarily limit the claimed inventions. Additionally, the illustrative embodiment of FIG. 11 may be varied, as described with respect to FIG. 5 through FIG. 9 or FIG. 10.

Figure 12:
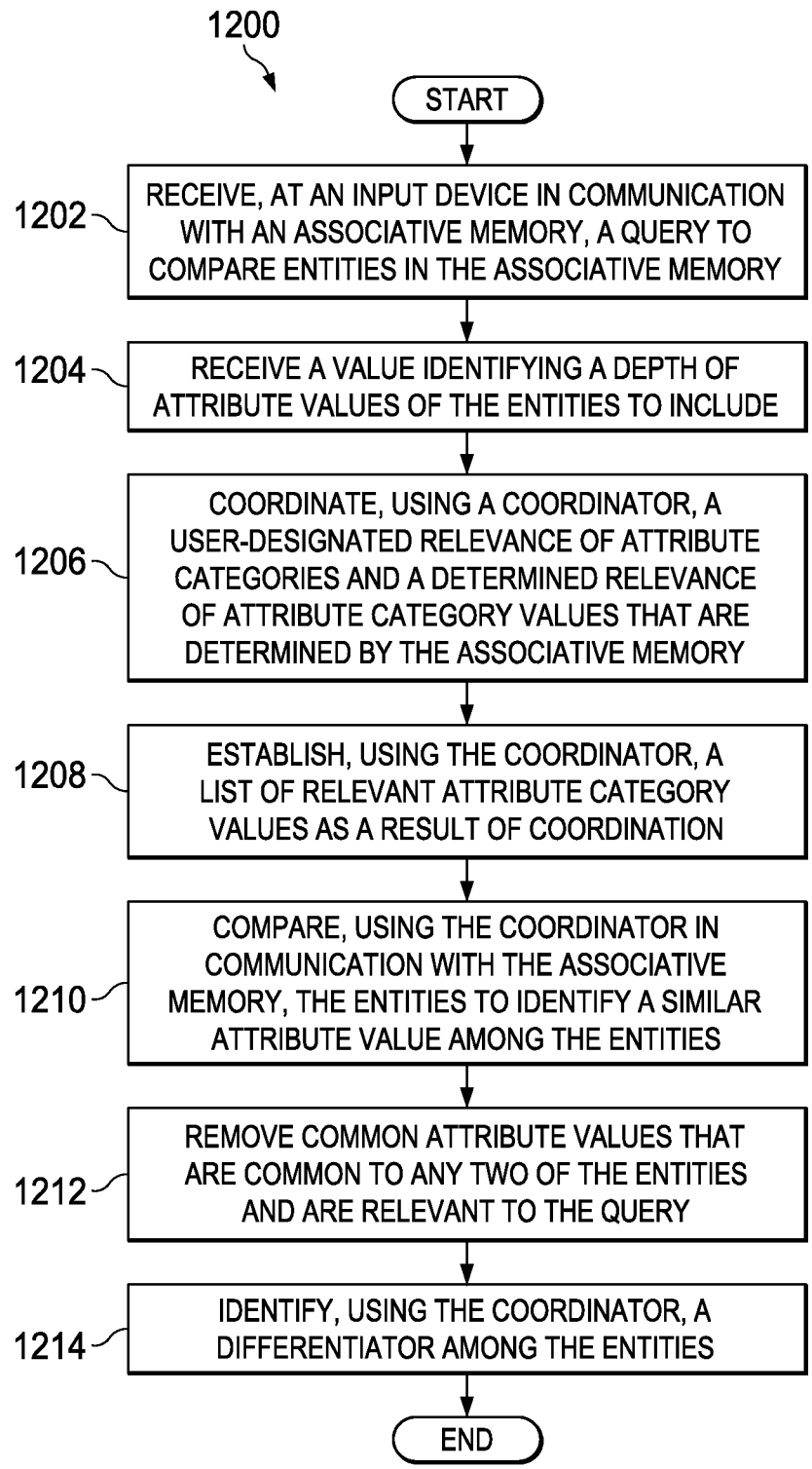
FIG. 12 is a flowchart illustrating a process for identifying a differentiator, in accordance with an illustrative embodiment.

FIG. 12 is a flowchart illustrating a process for identifying a relevant differentiator, in accordance with an illustrative embodiment. Process 1200 may be implemented by system 100 of FIG. 1, system 200 of FIG. 2, or data processing system 1300 of FIG. 13. Process 1200 may be a flow of, or an alternative to, the techniques described with respect to FIG. 3 through FIG. 11. With respect to FIG. 12, a "process" is described as performing an action. As used herein, a "process" is considered to be a non-transitory processor or other physical device configured to perform the action described, or may be considered to be a non-transitory computer readable storage medium storing computer usable program code configured, when executed, to carry out the action described.

The process may be implemented in an associative memory comprising a plurality of data and a plurality of associations among the plurality of data. The plurality of data may be collected into associated groups. The associative memory may be configured to be queried based on at least indirect relationships among the plurality of data.

The process may begin by receiving, at an input device in communication with an associative memory, a query to compare entities in the associative memory (block 1202). The process optionally may receive a value identifying a depth of attribute values of the entities to include (block 1204). The process then may coordinate, using a coordinator, a user-designated relevance of attribute categories and a determined relevance of attribute category values that are determined by the associative memory (block 1206).

The illustrative embodiments described herein, including those described with respect to FIG. 1 through FIG. 11, contemplate that the associative memory contributes to the determination of relevance of attribute categories as well as the relevance of corresponding attribute category values. Thus, while a user may designate relevance of these objects, the associative memory also assists in determining what attribute categories and attribute category values are relevant. The associative memory may assist with determining relevance by comparing relationships, both direct and indirect, among attribute categories and/or attribute category values. These relationships may indicate a relevance that is not immediately apparent to a user. If the associative memory comparison indicates a relevance not immediately apparent to the user, the associative memory may either automatically include the found relevance while implementing the illustrative embodiments, or may present the user with the opportunity to accept, deny, and/or modify any found relevance.

Returning to the illustrative embodiment of FIG. 12, after coordinating, the process may establish, using the coordinator, a list of relevant attribute category values as a result of coordination (block 1208). The process may then compare, using the coordinator in communication with the associative memory, the entities to identify a similar attribute value among the entities (block 1210). The process may remove common attribute values that are common to any two of the entities and are relevant to the query (block 1212). The process may identify, using the coordinator, a differentiator among the entities (block 1214). The process may terminate thereafter.

The illustrative embodiments described with respect to FIG. 12 may be varied. For example, while the process may terminate at block 1214, the process may also cause the differentiator to be displayed on one or more display devices. The differentiator may also be highlighted, possibly relative to other relevant attribute category values of interest.

The illustrative embodiments shown in FIG. 12 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Turning now to FIG. 13, an illustration of a data processing system is depicted in accordance with an illustrative embodiment. Data processing system 1300 in FIG. 13 is an example of a data processing system that may be used to implement the illustrative embodiments, such as system 100 of FIG. 1, or any other module or system or process disclosed herein. In this illustrative example, data processing system 1300 includes communications fabric 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output (I/O) unit 1312 allows for input and output of data with other devices that may be connected to data processing system 1300. For example, input/output (I/O) unit 1312 may provide a connection for user input through a keyboard, a mouse, and/or some other suitable input device. Further, input/output (I/O) unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1318 may be omitted because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

As another example, a storage device in data processing system 1300 is any hardware apparatus that may store data. Memory 1306, persistent storage 1308, and computer readable media 1320 are examples of storage devices in a tangible form.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1306, or a cache, such as found in an interface and memory controller hub that may be present in communications fabric 1302.

Data processing system 1300 may also include associative memory 1328. Associative memory 1328 may be associative memory 102 of FIG. 1 or associative memory 1202 of FIG. 12, and may have the properties described elsewhere herein. Associative memory 1328 may be in communication with communications fabric 1302. Associative memory 1328 may also be in communication with, or in some illustrative embodiments, be considered part of storage devices 1316. While one associative memory 1328 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
an associative memory, embodied as a non-transitory computer readable storage medium, comprising a plurality of data and a plurality of associations among the plurality of data, wherein the plurality of data is collected into associated groups, wherein the associative memory is configured to be queried based on at least indirect relationships among the plurality of data;
an input device, comprising a tangible input device, in communication with the associative memory, the input device configured to receive a query to compare entities in the associative memory; and
a coordinator, embodied as a processor, in communication with the associative memory, the coordinator configured to compare the entities to identify a similar attribute value among the entities, the coordinator further configured to identify a differentiator among the entities, wherein the differentiator comprises an attribute value of a given entity that is unique relative to all other attribute values of comparable entities having category types equal to a category type of the given entity, and wherein the differentiator is further relevant to the query, wherein the coordinator is further configured to identify the differentiator by receiving a value identifying a depth of an attribute of an entity to include, and wherein the coordinator is further configured to identify the differentiator by removing common attribute values that are common to any two of the entities and are relevant to the query.

2. The system of claim 1, wherein one or more of the common attribute values are beyond the depth.

3. The system of claim 1, further comprising:
a display device in communication with the associative memory and configured to display the differentiator.

4. The system of claim 1, wherein the coordinator is further configured to coordinate a user-designated relevance of attribute categories and a determined relevance of attribute category values that are determined by the associative memory, wherein the coordinator is programmed to establish a list of relevant attribute category values as a result of a coordination, and wherein the coordinator is further configured to use the list to identify the differentiator.

5. The system of claim 4, wherein the associative memory is configured to store the list and to order the relevant attribute category values in order of relevance.

6. The system of claim 1, wherein the coordinator is further configured to examine a plurality of sets of attribute categories to a particular depth and further configured to determine what value or values are relevant in identified differences among the plurality of sets of attribute categories.

7. A system comprising:
an associative memory, embodied as a non-transitory computer readable storage medium, comprising a plurality of data and a plurality of associations among the plurality of data, wherein the plurality of data is collected into associated groups, wherein the associative memory is configured to be queried based on at least indirect relationships among the plurality of data;
an input device, comprising a tangible input device, in communication with the associative memory, the input device configured to receive a query to compare a first entity to a second entity using the associative memory, and further configured to receive an attribute category associated with both the first entity and the second entity;
a coordinator, embodied as a processor, in communication with the associative memory, the coordinator configured to compare first attribute values of the first entity and second attribute values of the second entity, the first attribute values and the second attribute values both associated with the attribute category, the coordinator further configured to remove third attribute values from both the first attribute values and the second attribute values, wherein the third attribute values are common to both the first attribute values and the second attribute values, wherein the coordinator is further configured to store a fourth attribute value that remains after removal of the third attribute values, the fourth attribute value being associated with one of the first entity and the second entity, and wherein the input device is further configured to receive a depth of attribute values to include when comparing;
wherein the fourth attribute value is unique to the one of the first entity and the second entity; and
wherein the coordinator is further configured to remove fifth attribute values from one or both of the first attribute values and the second attribute values, wherein the fifth attribute values are beyond the depth.

8. The system of claim 7 further comprising:
a display in communication with the associative memory and configured to display the fourth attribute value.

9. The system of claim 8, wherein the display is further configured to highlight the fourth attribute value and also to display fifth attribute values common to both the first entity and the second entity.

10. A method implemented in an associative memory, embodied as a non-transitory computer readable storage medium, comprising a plurality of data and a plurality of associations among the plurality of data, wherein the plurality of data is collected into associated groups, wherein the associative memory is configured to be queried based on at least indirect relationships among the plurality of data, the method comprising:
receiving, at an input device, comprising a tangible input device, in communication with the associative memory, a query to compare entities in the associative memory;
comparing, using a coordinator, comprising a tangible input device, in communication with the associative memory, the entities to identify a similar attribute value among the entities; and
identifying, using the coordinator, a differentiator among the entities by removing common attribute values that are common to any two of the entities and are relevant to the query, wherein the differentiator comprises an attribute value of a given entity that is unique relative to all other attribute values of comparable entities having category types equal to a category type of the given entity, wherein the differentiator is further relevant to the query, and wherein identifying the differentiator further includes removing common attribute values that are common to any two of the entities and are relevant to the query.

11. The method of claim 10, further comprising:
identifying, using the coordinator, the differentiator by receiving a value identifying a depth of attribute values of the entities to include.

12. The method of claim 10 further comprising:
coordinating, using the coordinator, a user-designated relevance of attribute categories and a determined relevance of attribute category values that are determined by the associative memory;
establishing, using the coordinator, a list of relevant attribute category values as a result of a coordination; and
using, by the coordinator, the list to identify the differentiator.

* * * * *